United States Patent
Zhang et al.

(10) Patent No.: US 11,651,038 B2
(45) Date of Patent: May 16, 2023

(54) OPTIMIZING GEOGRAPHIC REGION SELECTION

(71) Applicant: Google LLC, Mountain View, CA (US)

(72) Inventors: Fan Zhang, Fair Lawn, NJ (US); Nicolas H. Remy, Marly-le-Roi (FR); Anne-Claire Haury, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1048 days.

(21) Appl. No.: 16/347,358

(22) PCT Filed: May 30, 2018

(86) PCT No.: PCT/US2018/035143
§ 371 (c)(1),
(2) Date: May 3, 2019

(87) PCT Pub. No.: WO2019/231439
PCT Pub. Date: Dec. 5, 2019

(65) Prior Publication Data
US 2020/0265089 A1    Aug. 20, 2020

(51) Int. Cl.
*G06F 16/909* (2019.01)
*G06F 16/9035* (2019.01)
(Continued)

(52) U.S. Cl.
CPC .......... *G06F 16/909* (2019.01); *G01C 21/32* (2013.01); *G01C 21/3644* (2013.01); *G06F 16/901* (2019.01); *G06F 16/9035* (2019.01)

(58) Field of Classification Search
None
See application file for complete search history.

(56) References Cited

U.S. PATENT DOCUMENTS 8,782,045 B1    7/2014  Vaver
8,855,681 B1 *  10/2014 George ................... H04W 4/02
                                              455/456.2
(Continued)

FOREIGN PATENT DOCUMENTS

JP    2014-186538    10/2014
JP    2014-203191    10/2014
(Continued)

OTHER PUBLICATIONS

PCT International Preliminary Report on Patentability in International Appln. No. PCT/US2018/035143, dated Dec. 10, 2020, 9 pages.
(Continued)

*Primary Examiner* — Mark D Featherstone
*Assistant Examiner* — Navneet Gmahl
(74) *Attorney, Agent, or Firm* — Fish & Richardson P.C.

(57) ABSTRACT

Methods, systems, and apparatus, including computer programs encoded on a computer storage medium, for obtaining i) historical location data specifying geographic locations of the user over a period of time that is included in a user profile of the user and ii) predefined geographic location data specifying a predefined geographic location of the user that is included in the user profile of the user; identifying a pair of cross-contaminated geographic regions that both include geographic locations specified by the historical location data of the user profiles for each of a threshold number of users of the plurality of users, and in response, merging the pair of cross-contaminated geographic regions to define a merged geographic region; and merging the merged geographic region with additional geographic regions until a cross-contamination between a resulting merged geographic region created by the merging and other geographic regions is reduced to a specified level of cross-contamination.

18 Claims, 5 Drawing Sheets

(51) Int. Cl.
*G01C 21/32* (2006.01)
*G06F 16/901* (2019.01)
*G01C 21/36* (2006.01)

(56) References Cited

U.S. PATENT DOCUMENTS

| | | | |
|---|---|---|---|
| 9,396,501 B1* | 7/2016 | Nestler | H04L 67/306 |
| 9,641,972 B1* | 5/2017 | Hughes | H04W 4/021 |
| 9,877,148 B1* | 1/2018 | Siegel | H04W 12/03 |
| 10,545,028 B1* | 1/2020 | Sanchez | G01C 21/3679 |
| 2011/0276392 A1 | 9/2011 | Vaver et al. | |
| 2012/0046995 A1* | 2/2012 | Petersen | H04W 12/02 |
| | | | 707/E17.014 |
| 2012/0258735 A1* | 10/2012 | Monteverde | H04W 4/021 |
| | | | 455/456.3 |
| 2013/0018951 A1* | 1/2013 | Piccinini | H04L 65/1063 |
| | | | 709/204 |
| 2013/0268357 A1* | 10/2013 | Heath | G06Q 10/10 |
| | | | 726/26 |
| 2013/0345969 A1* | 12/2013 | Udeshi | H04W 4/023 |
| | | | 701/461 |
| 2014/0095302 A1* | 4/2014 | Monteverde | G06Q 30/0261 |
| | | | 705/14.58 |
| 2014/0189013 A1* | 7/2014 | Abhyanker | G06Q 50/01 |
| | | | 709/204 |
| 2015/0304437 A1* | 10/2015 | Vaccari | G06V 20/30 |
| | | | 709/204 |
| 2016/0048876 A1* | 2/2016 | Murphy | G06F 16/29 |
| | | | 705/14.58 |
| 2016/0295371 A1* | 10/2016 | Zhyshko | G01S 19/42 |
| 2017/0127233 A1* | 5/2017 | Liang | H04W 4/21 |
| 2017/0353825 A1* | 12/2017 | D'Alberto | H04L 67/535 |
| 2017/0353827 A1* | 12/2017 | D'Alberto | G06Q 30/0267 |
| 2018/0040011 A1* | 2/2018 | Milton | H04W 4/021 |
| 2019/0033078 A1* | 1/2019 | D'Alberto | G06Q 30/0261 |
| 2019/0087840 A1* | 3/2019 | Zachariah | G06Q 30/0205 |
| 2021/0334275 A1* | 10/2021 | Smart | G06F 16/2456 |

FOREIGN PATENT DOCUMENTS

| | | |
|---|---|---|
| JP | 2017-084411 | 5/2017 |
| KR | 10-1322778 | 10/2013 |
| KR | 10-2018-0081104 | 7/2018 |
| WO | WO 2011/046971 | 4/2011 |
| WO | WO 2017/077543 | 5/2017 |
| WO | WO 2017/079697 | 5/2017 |

OTHER PUBLICATIONS

PCT International Search Report and Written Opinion in International Appln. No. PCT/US2018/035143, dated Oct. 9, 2018, 16 pages.
Notice of Allowance in Japanese Appln. No. 2020-566830, dated Feb. 7, 2022, 5 pages (with English Translation).
Office Action in Korean Appln. No. 10-2020-7035476, dated Oct. 26, 2022, 15 pages (with English translation).

* cited by examiner

OPTIMIZING GEOGRAPHIC REGION SELECTION

FIELD

The present specification relates to geographic region selection, and in particular, selective merging of geographic regions.

BACKGROUND

In general, to measure the effect of online digital content on offline behavior, randomized experiments can be utilized. For example, to measure the effects of presenting a particular set of online digital content on user behavior (e.g., visits to particular locations) in a specific region, randomized experimentation could be implemented by randomly segmenting a user population into two groups, e.g., a control group and a treatment group. The treatment group would receive content from the particular set of online digital content while the control group would not receive such. A comparison of the offline behavior of the control group and the treatment group can reveal how exposure to the particular set of online content affected the offline behavior of users. However, implementation of such randomized experiments can be difficult to implement based on various issues that can arise.

SUMMARY

Innovative aspects of the subject matter described in this specification may be embodied in methods that include the actions of obtaining, for each user of a plurality of users, i) historical location data specifying geographic locations of the user over a period of time that is included in a user profile of the user and ii) predefined geographic location data specifying a predefined geographic location of the user that is included in the user profile of the user; for each point of interest among a plurality of points of interest: i) creating a subset of the plurality of users that includes each user having historical location data specifying the point of interest; ii) calculating, for each user of the subset of users, a distance between a geographic location of the point of interest and the predefined geographic location of the user that is included in the user profile of the user; iii) determining a threshold distance that exceeds the calculated distances for a predetermined portion of the users; and iv) defining a geographic region for the point of interest that includes a) the geographic location of the point of interest and b) a geographic area that is within the threshold distance of the geographic location of the point of interest; identifying a pair of cross-contaminated geographic regions that both include geographic locations specified by the historical location data of the user profiles for each of a threshold number of users of the plurality of users; in response to identifying the pair of cross-contaminated geographic regions that both include geographic locations specified by the historical location data of the user profiles for each of a threshold number of users of the plurality of users, merging the pair of cross-contaminated geographic regions to define a merged geographic region; and merging the merged geographic region with one or more additional geographic regions until a cross-contamination between a resulting merged geographic region created by the merging and other geographic regions is reduced to a specified level of cross-contamination.

Other embodiments of these aspects include corresponding systems, apparatus, and computer programs, configured to perform the actions of the methods, encoded on computer storage devices.

These and other embodiments may each optionally include one or more of the following features. For instance, identifying a further pair of cross-contaminated geographic regions that both include geographic locations specified by the historical location data of the user profiles for each of a threshold number of users of the plurality of users, wherein the further pair of cross-contaminated geographic regions includes the merged geographic region; and in response to identifying the further pair of cross-contaminated geographic regions that both include geographic locations specified by the historical location data of the user profiles for each of a threshold number of users of the plurality of users, merging the further pair of cross-contaminated geographic regions to define a further merged geographic region. Identifying two pairs of cross-contaminated geographic regions where i) a first pair of cross-contaminated geographic regions both include geographic locations specified by the historical location data of the user profiles for each of a threshold number of first users of the plurality of users and ii) a second pair of cross-contaminated geographic regions both include geographic locations specified by the historical location data of the user profiles for each of a threshold number of second users of the plurality of users; identifying a first contamination of the first pair of cross-contaminated geographic regions and a second contamination of the second pair of cross-contaminated geographic regions; comparing the first contamination and the second contamination to determine that the first contamination is greater than the second contamination; and based on the comparing, merging the first pair of cross-contaminated geographic regions to define a further merged geographic region. After merging any two geographic regions, identifying a contamination of each merged geographic region and each unmerged geographic region; comparing the contamination of each merged geographic region and each unmerged geographic region with a cross-contamination threshold; determining that the contamination of each merged geographic region and each unmerged geographic region is less than the cross-contamination threshold; and in response to determining that the contamination of each merged geographic region and each geographic region is less than the cross-contamination threshold, ceasing merging of the geographic regions.

A parameter for determining the contamination threshold is a number of users of the plurality of users having historical location data specifying any pair of geographic locations of the user that is included in the user profile of the user. A parameter for determining the contamination threshold is a maximum contamination between any pair of geographic regions. Identifying the pair of cross-contaminated geographic regions that both include geographic locations specified by the historical location data of the user profiles for each of the threshold number of users of the plurality of users further includes: determining that the user profile of each user of the threshold number of users includes profile data that indicates a number of distinct location data associated with each of the geographic regions within a predetermined time period. Obtaining, for each user of a plurality of users, i) historical location data specifying geographic locations of the user over a period of time that is included in a user profile of the user and ii) predefined geographic location data specifying a predefined geographic location of the user that is included in the user profile of the user further includes: obtaining, for each user of the plurality of users, user-provided input of the predefined geographic location that is included in the user profile of the user. Obtaining, for each user of a plurality of users, i) historical location data specifying geographic locations of the user over a period of time that is included in a user profile of the user and ii) predefined geographic location data specifying a predefined geographic location of the user that is included in the user profile of the user further includes: obtaining, for each user of the plurality of users, a geographic location where one or more queries are provided by the user, the geographic location proximate to the geographic location of the point of interest.

Particular implementations of the subject matter described in this specification can be implemented so as to realize one or more of the following advantages. For example, implementations of the subject matter provide for the efficient usage of computer resources by allocating computer resources to a selected population of users that is maximized for exposure of digital content while minimizing exposure of the digital content to an unselected population of users. That is, the computer resources are made efficient by limiting the exposure of the digital content to a selected population of users, and not exposing the digital content to other users. This avoids expending computing resources for transmission of the digital content to the unselected population of users, with the computing resources be better utilized in the transmission of the digital content to the selected population of users. Furthermore, this reduces network congestion and increases network efficiency as a result of transmitting the digital content to a subset of the population of users. Network bandwidth is conserved by transmitting the digital content from the servers to a selected population of the computing devices as opposed to a larger set of computing devices. The techniques discussed herein also enable the creation of geographic regions that are not cross-contaminated. That is, the techniques discussed herein identify different geographic locations that are included in historical geographic data for a particular same set of users, and merge those geographic regions into a same geographic region. Meanwhile, geographic locations that are not included in the historical geographic data for the particular same set of users can be part of a different geographic region. Because the same geographic region and the different geographic region reduce or minimize the geographic locations that are included in the historical geographic data for a same set of users, the two geographic regions are considered to not be cross-contaminated, thereby improving the reliability and accuracy of a system that uses one of these geographic regions as a treatment area and a different one of these geographic regions as a control area. This reduction and/or elimination of cross-contamination allows a system to more precisely and more quickly determine the offline user behavior that is caused by online exposure to online content because the users in the treatment area that are exposed to the online content have a low likelihood of entering the control area. The creation of the various uncontaminated geographic regions are also created in a more efficient and effective manner by starting with a small set of geographic locations that are included in a given geographic region, and then iteratively adding other nearby geographic regions that are deemed cross-contaminated with the given geographic region until the level of cross-contamination reaches an acceptable (e.g., threshold) level. This process ensures that a specified level of cross-contamination is reached while not making the resulting geographic region any larger than it needs to be.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
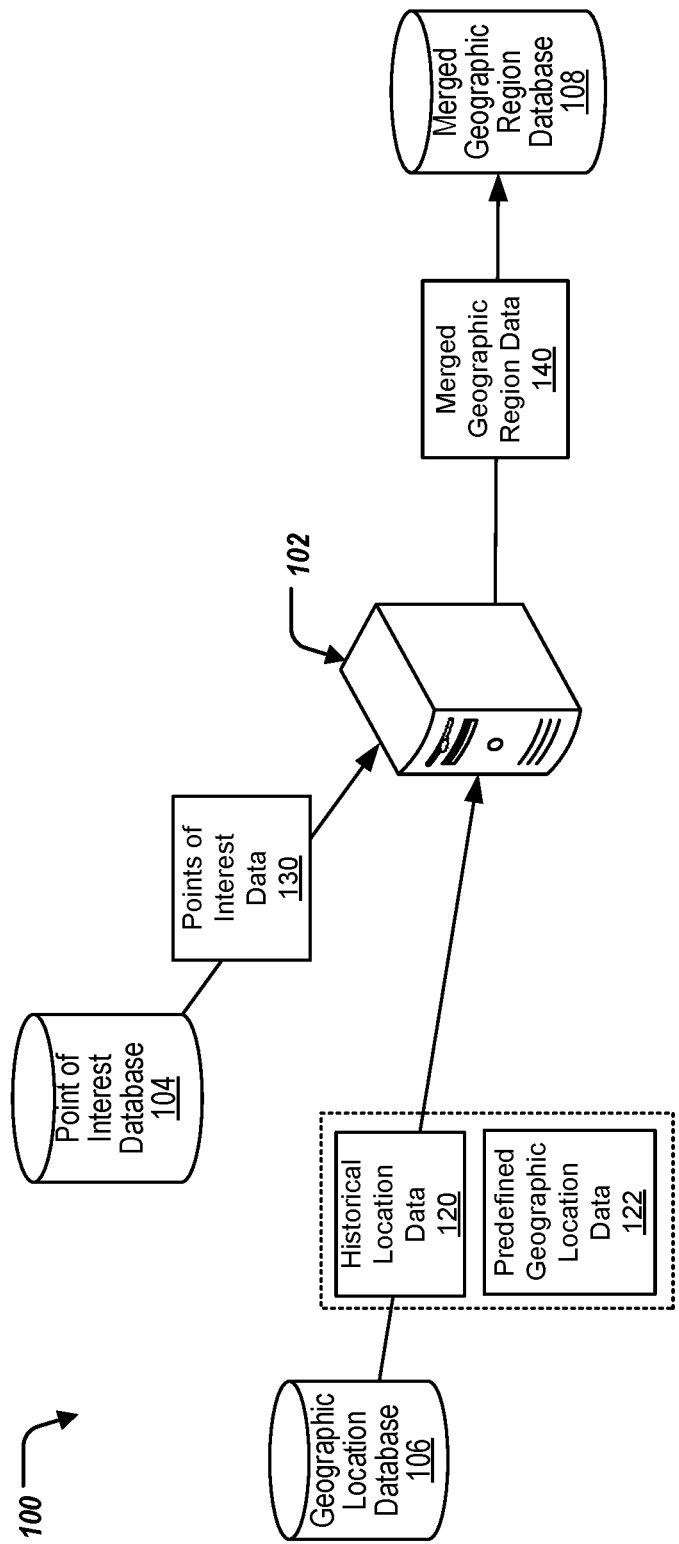
FIG. 1 depicts a system for selective merging of geographic regions.

This document describes methods, systems, and computer readable medium for selective merging of geographic regions to create a geographic region that has no more than a specified amount of cross-contamination with neighboring geographic regions. Specifically, points of interest (such as physical stores) can be located within geographic regions. In some cases, the geographic region can be the smallest physical area that includes the majority of visitors to the point of interest. These geographic regions can be used for determining how exposure digital content affects offline user behavior. For example, a first geographic region can be used as a control geographic region (e.g., no exposure to the digital content) while a second geographic region can be used as a treatment geographic region (e.g., exposure to the digital content). However, the results obtained using treatment and control regions that are "too close" to one another—e.g., too many people included in the treatment region might also visit a (neighboring) geographic region that is included in the control region. For example, a coffee store can have two locations that are geographically proximate to one another, but that are each within two differing geographic regions (e.g., one in the treatment region and one in the control region). In this example, a user can be exposed to the digital content while within the treatment region) but then visit the coffee store that is in the control region. This is an example of cross-contaminated regions because the user visits both of the control region and the treatment region, and the exposure to the digital content occurs in the treatment region, but the user visits the coffee store in the control region. To alleviate the possibility of such cross-contamination, the two geographic regions can be merged into a single geographic region that is used as the treatment region, while another geographic region that is not visited by the user (e.g., as determined based on historical geographic data for the user) can be used as the control region.

In some cases, the geographic regions are selectively merged. That is, to selectively merge geographic regions, for each user of a plurality of users, data is obtained including i) historical location data specifying geographic locations of the users over a period of time and ii) predefined geographic location data specifying a predefined geographic location of the user. The historical location data can include locations that the user has "visited" over the period of time, and the predefined geographic location can be a location that associated with (within a user profile) the user, such as a home address or work address. However, the predefined geographic location can also be automatically determined based on one or more factors, such as time spent at locations, and how often the user visits the locations.

For each point of interest of a plurality of points of interest, a subset of the users is created that includes users having historical location data associated with the point of interest. That is, each user of the subset has visited the point of interest based on the historical location data associated with the user. For each user of the subset of users, a distance is calculated between the point of interest and the predefined geographic location of the user. A threshold distance is determined such that a predetermined portion (or percentage) of the calculated distances associated with the users is less than the threshold distance. Next, a geographic region can be determined for the point of interest that includes the geographic location of the point of interest and a geographic area that is within the threshold distance of the geographic location of the point of interest. For example, for a point of interest, the geographic location of the point of interest can serve as a center of the geographic region, with the geographic region extending radially outwards from the center to the threshold distance.

A pair of cross-contaminated geographic regions can be identified. The pair of cross-contaminated geographic regions can include geographic locations where at least a threshold number of users have historical location data associated with both of the geographic regions of the pair. That is, the cross-contaminated regions are identified based on a threshold number of users having historical location data with both geographic regions. The cross-contaminated georgic regions can be merged to define a merged geographic region, with the merged geographic region being merged with additional geographic regions until a cross-contamination between a resulting merged geographic region created by the merging and other geographic regions is reduced to a specified level of cross-contamination. That is, the merging is continued between the merged regions and the unmerged regions until each of the geographic regions is below a cross-contamination threshold.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content sen.er that may be more relevant to the user. In addition, certain data may be treated in one or more ways before it is stored or used, so that personally identifiable information is removed. For example, a user's identity may be treated so that personally identifiable information for the user is not determined, or a user's geographic location may be generalized where location information is obtained (such as to a city, ZIP code, or state level), so that a particular location of a user cannot be determined. Thus, the user may haw control over how information is collected about the user and used by a content server.

FIG. 1 depicts a system 100 for selective merging of geographic regions. The system 100 includes a computing device 102, a point-of-interest database 104, a geographic location database 106, and a merged geographic region database 108. The computing device 102 can be in communication with the databases 104, 106, 108 over one or more networks (not shown). In some examples, the computing device 102 can include one or more modules, and can be implemented as a combination of computing systems or in a same set of physical hardware.

The computing device 102 can obtain, for each user of a plurality of users, i) historical location data 120 from the geographic location database 106 for the user and ii) predefined geographic location data 122 from the geographic location database 106 for the user. Specifically, for a user, the historical location data 120 specifies geographic locations of the user over a period of time, e.g., as included in a user profile of the user. The geographic locations of the user can include geographic locations that the user has visited, and further, only geographic locations that the user has visited i) over a particular period of time (e.g., over the past day, week, month, year) and/or ii) over a threshold number of distinct visits for each geographic location. In some examples, the historical location data 120 can specifically include only geographic locations of the user that, for a particular geographic location, the user has visited over a threshold number of distinct time for a particular time period (e.g., five visits over 1 week). In some examples, the historical location data 120 of the user can include geographic locations where the user provides search queries to a search engine through a (mobile) computing device. In some examples, the historical location data 120 of the user can include only geographic locations where the user provides a threshold number of search queries, and/or a threshold number of search quarries over a period of time. In some examples, the geographic locations where the user provides search queries to the search engine through the (mobile) computing device can be geographically proximate to one or more geographic points of interest, described further herein.

The predefined geographic location data 122, for a particular user, specify a predefined geographic location of the user, e.g., as included by the user profile of the user. In some examples, the predefined geographic location of the user can include user-provided input of the predefined geographic location. That is, the user can provide the predefined geographic location to associate with the user profile of the user, e.g., a work or home address. In some examples, the predefined geographic location of the user can be a geographic location that the user visits the most over a period of time, and is determined automatically based on the historical location 120. In some examples, the predefined geographic location of the user can be a geographic location where the user provides the greatest volume of search queries to the search engine through the (mobile) computing device, and/or the greatest volume of search queries to the search engine over a period of time.

The computing device 102 can receive points of interest data 130 from the points of interest database 104. In short, the computing device 102 can process the points of interest data 130 and with the historical location data 120 and the predefined geographic location data 122, the computing device 102 can define geographic regions for each of the points of interest of the points of interest data 130. Specifically, the computing device 102 creates a subset of the plurality of users that includes each user having historical location data specifying the point of interest. For example, for each point of interest, the computing device 102 examines the historical location data 120 to identify historical data 120 that specifies the point of interest. The computing device 102 can then identify the users and the user profiles of the users that includes the historical data 120 that specifies the point of interest. The computing device 102 can create the subset of the users that have historical location data 120 specifying the point of interest using these identified users.

The computing device 102 can, for each point of interest, calculate, for each user of the subset of users, a distance between the geographic location of the point of interest and the predefined geographic location of the user that is included in the user profile of the user. For example, the point of interest can include a particular coffee store (of a chain of coffee stores), and the predefined geographic location of the user can include a work address of the user. The computing device 102 can calculate the distance between the particular coffee store and the work address of the user (e.g., 2 miles). In short, the computing device 102 can calculate distances between the point of interest and the predefined geographic locations for the users of the subset of users.

The computing device 102 can, for each point of interest, determine a threshold distance that exceeds the calculated distances for a predetermined portion of the users. Specifically, the computing device 102 determines the threshold distance such that a predetermined portion (or percentage) of the calculated distances are less than the threshold distance. For example, the computing device 102 can calculate distances $d_1, d_2, \ldots, d_n$ for the subset of users n. The computing device 102 can determine the threshold distance $d_t$ such that a predetermined portion of the calculated distances $d_1, d_2, \ldots, d_n$ are less than the threshold distance $d_t$. For example, the predetermined portion of the calculated distances can be 80% (the predetermined portion/percentage can be set based on a desired performance of the system 100). The computing device 102 can determine the threshold distance $d_t$ such that 80% of the calculated distances $d_1, d_2, \ldots, d_n$ are less than the threshold distance $d_t$. For example, the computing device 102, for the predetermined portion of 80%, determines that the threshold distance is 3.5 miles such than 80% of the calculated distances $d_1, d_2, \ldots, d_n$ are less than 3.5 miles.

The computing device 102 can, for each point of interest, define a geographic region of the point of interest that includes a) the geographic location of the point of interest and b) a geographic area that is within the threshold distance $d_t$ of the geographic location of the point of interest. For example, the computing device 102, for the point of interest, defines the geographic region of the point of interest to include the geographic location as the center and extends radially outward to the threshold distance $d_t$ for the point of interest (e.g., a circular geographic region) to include the geographic area between the geographic location of the point of interest and the threshold distance $d_t$. However, the geographic region can include other geographic shapes, and can be defined by other geographic parameters.

Figure 2:
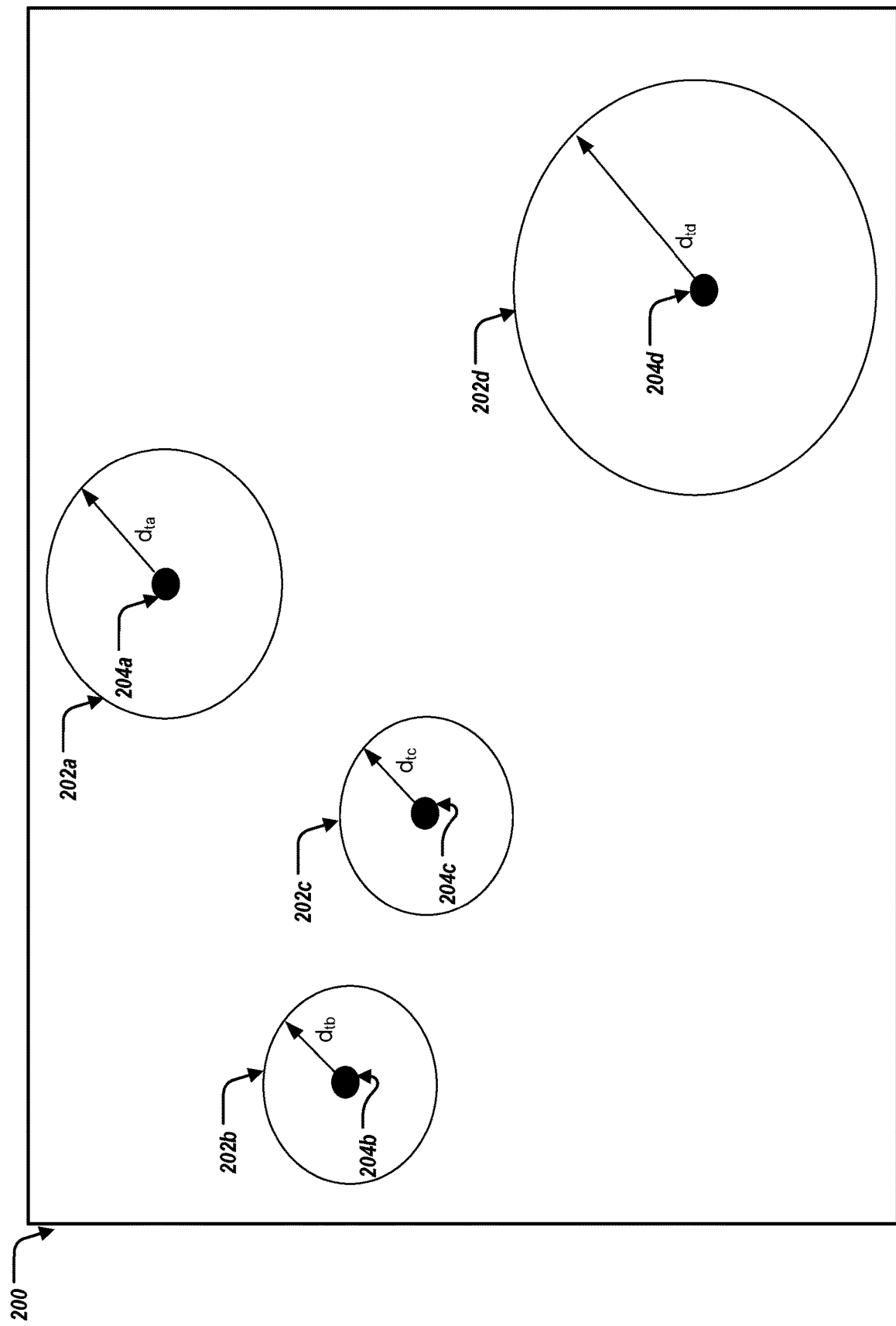
FIG. 2 depicts an illustration of geographic regions prior to merging of the geographic regions.

FIG. 2 illustrates a graphical user interface (GUI) 200 of a visual depiction of a plurality of geographic regions 202a, 202b, 202c, 202d (collectively referred to as geographic regions 202). The GUI 200 includes display of four geographic regions 202, but any number of geographic regions 202 can be shown, e.g., based on a scaling size of the GUI 200. Continuing the example above, for a particular point of interest, the computing device 102 defines the geographic region 202a that includes the geographic location 204a and the geographic area that is within the threshold distance $d_{ta}$ of the geographic location 204a of the point of interest. Similarly, the computing device 102 defines the geographic region 202b that includes the geographic location 204b and the geographic area that is within the threshold distance $d_tb$ of the geographic location 204b of the point of interest; the computing device 102 defines the geographic region 202c that includes the geographic location 204c and the geographic area that is within the threshold distance $d_{tc}$ of the geographic location 204c of the point of interest; and the computing device 102 defines the geographic region 202d that includes the geographic location 204d and the geographic area that is within the threshold distance $d_{td}$ of the geographic location 204d of the point of interest. Continuing the example above, each of the points of interest of each of the geographic regions 202 can include different coffee stores locations of a common chain coffee store franchise.

Referring back to FIG. 1, the computing device 102 identifies a pair of geographic regions that are cross-contaminated. Specifically, the computing device 102 identifies pairs of geographic regions that both include geographic locations specified by the historical location data 120 for each of a threshold number of users (e.g., two or more). In other words, the computing device 102 identifies at least one pair of geographic regions where at least a threshold number of users have historical location data 120 specifying locations in both geographic regions of the pair of geographic regions. The historical location data 120 can be specified by, and/or included in, user profiles of the users.

When the computing device 102 identifies pairs of geographic regions that both include geographic locations specified by the historical location data 120 for each of a threshold number of users (e.g., two or more different users), the computing device 102 classifies the pair of geographic regions as cross-contaminated. In other words, the cross-contaminated regions are the two or more different geographic regions that are both visited by the users, as determined using the historical location data 120 of the users.

In some examples, the computing device 102 only considers two geographic regions as being cross-contaminated when the historical location data 120 indicates that the users have each visited the different regions within a predetermined amount of times. That is, the computing device 102 identifies pairs of geographic regions as cross-contaminated geographic regions when the pairs of geographic regions include geographic locations that are i) specified by a number of distant location data associated with each geographic region greater than a threshold and ii) within a predetermined time period. For example, assume that the predetermined time period is 1 week (or some other appropriate amount of time). In this example, for purposes of determining whether there is cross-contamination between two geographic regions, the computing device 102 can ignore (or otherwise discount) the historical data 120 specifying that a particular user's visits to the two geographic regions were separated by at least the predetermined time period.

Referring to FIG. 2, in the illustrated example, the computing device 102 can identify the geographic regions 202b and 202c as cross-contaminated. That is, the computing deice 102 identifies the geographic regions 202b and 202c that both include geographic locations specified by the historical location data 120 for each of a threshold number of users. In other words, the computing device 102 identifies the geographic regions 202b and 202c as cross-contaminated as a result of a threshold number of users having historical location data 120 included by the respective user profiles that is associated with both of the geographic regions 202b and 202c. Continuing the example above, the pair of geographic regions 202b and 202c can include coffee stores of the same coffee stores franchise, and a threshold number of users visited both of the coffee stores (e.g., points of interests 204b and 204c) of the geographic regions 202b and 202c based on the historical location data 120.

Referring back to FIG. 1, the computing device 102, in response to identifying a pair of geographic regions that are cross-contaminated, merges the pair of cross-contaminated geographic regions to define a merged geographic region.

Specifically, the computing device 102 merges the pair of cross-contaminated geographic regions to define a merged geographic region that includes properties of both of the cross-contaminated geographic regions. That is, the merged geographic region can include the points of interest of both of the cross-contaminated geographic regions, and further, includes the geographic areas between the geographic location of each point of interest and the threshold distance $d_t$ of each point of interest.

Figure 3:
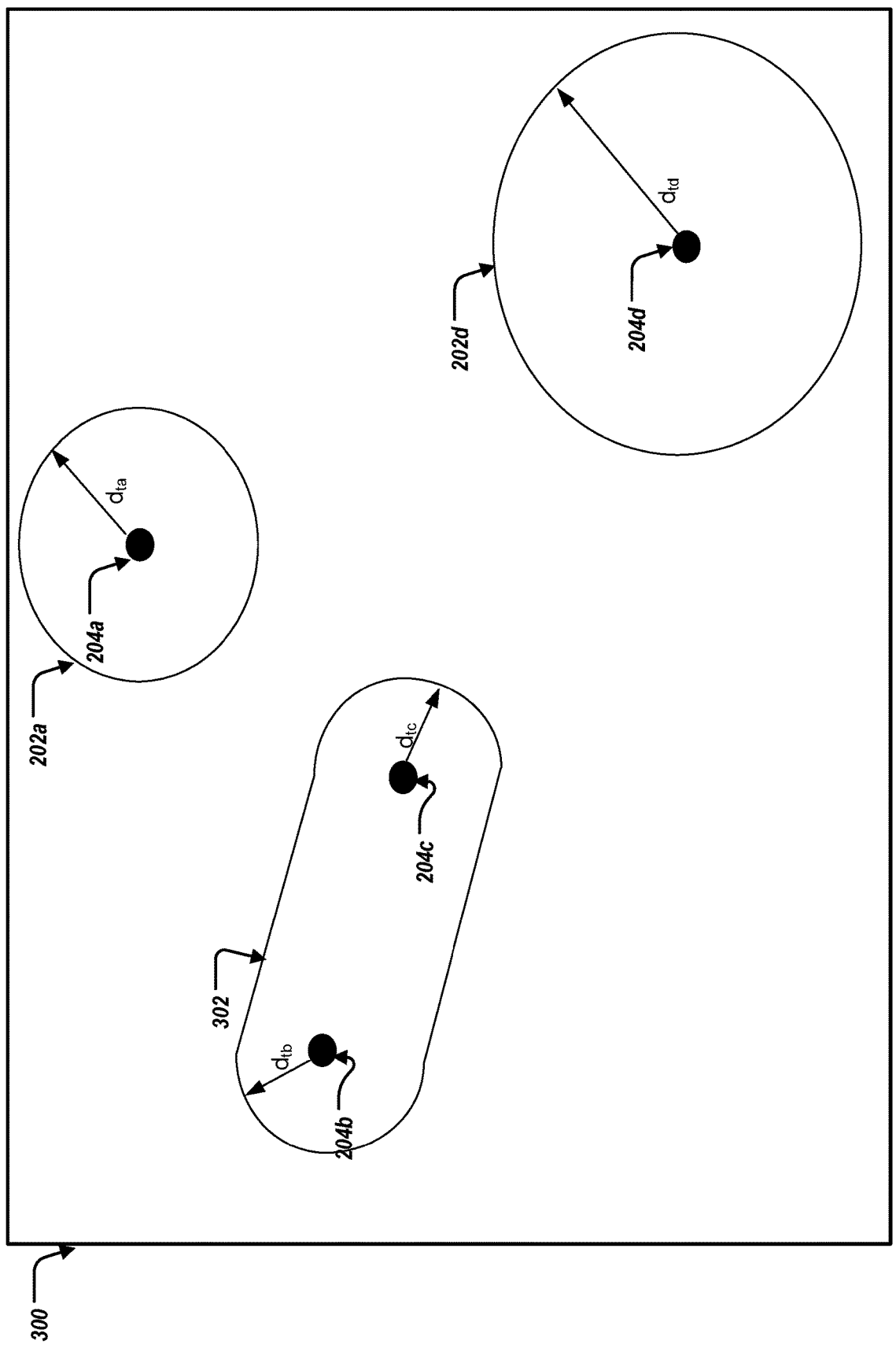
FIG. 3 depicts an illustration of the geographic regions after merging of the geographic regions.

Referring to FIG. 3, the computing device 102 can merge the cross-contaminated geographic regions 202b and 202c to define the merged geographic region 302. The merged geographic region 302 includes the geographic locations 204a and 204b of the respective points of interest of the cross-contaminated geographic regions 202b and 202c. Further, the merged geographic region 302 includes i) the geographic area that is within the threshold distanced $d_{ta}$ of the geographic location 204a and ii) the geographic area that is within the threshold distance $d_{tb}$ of the geographic location 204b. In some examples, the merged geographic region 302 further includes geographic area defined between the geographic regions 202b and 202c.

Referring back to FIG. 1, the computing device 102 merges the merged geographic region with one or more additional geographic regions until a cross-contamination between a resulting merged geographic region created by the merging and other geographic regions is reduced to a specified level of cross-contamination. Specifically, the computing device 102 identifies a further pair of cross-contaminated geographic regions that both include geographic locations specified by the historical location data 120 of the user profiles for each of a threshold number of users. The further pair of cross-contaminated geographic regions includes the (previously) merged geographic region. The computing system 102, in response to identifying the further pair of cross-contaminated geographic regions, merges the further pair of cross-contaminated geographic regions to define a further merged geographic region. For example, referring to FIG. 3, the computing device 102 can identify geographic region 202a and merged geographic region 302 that both include geographic locations specified by the historical location data 120 of a threshold number of users. The computing device 102 can merge the geographic regions 202a and 302.

In some examples, the computing device 102 can identify a contamination of each geographic region, including merged geographic regions and unmerged geographic regions, and when the contamination of each geographic region is less than a level of cross-contamination, the merging of geographic regions is ceased. Specifically, the computing system 102, after merging any two geographic regions, identifies a contamination of each merged geographic region and each unmerged geographic region. The computing system 102 compares the contamination of each merged geographic region and each unmerged geographic region with a cross-contamination threshold, and determines that the contamination of each merged geographic region and each unmerged geographic region is less than the cross contamination threshold. In response to determining that the contamination of each merged geographic region and each (unmerged) geographic region is less than the cross-contamination threshold, the computing system 102 ceases further merging of any further geographic regions (unmerged and merged geographic regions).

The computing device 102 can output merged geographic region data 140 to the merged geographic region database 108. The merged geographic region data 140 can include data regarding the merged geographic regions, such as the merged geographic region 302, for storage by the merged geographic region database 108. In some examples, the merged geographic region data 140 additionally further includes data regarding the unmerged geographic regions (e.g., the geographic regions 202a and 202d).

In some examples, the computing device 102 determines the contamination threshold based on a number of users of the plurality of users having historical location data 120 that specifies any pair of geographic locations of the user that is included in the user profile of the user. That is, for each user of the plurality of users, the computing device 102 determines whether the user profile of the user includes historical location data 120 that specifies any pair of geographic locations of the user. The computing device 102 can then determine a quantity of users that have such historical location data 120 that specifies any pair of geographic locations of the users that is included in the user profile of the user. The computing device 102 can then determine the contamination threshold based on this quantity of users. For example, 10% of the users can have historical location data 120 that specifies any pair of geographic locations of the user that is included in the user profile of the user, and the computing device 102 can determine the contamination threshold such that the contamination between any two geographic regions is less than 10% (or some other appropriate amount). In some examples, the computing device 102 determines the contamination threshold based on a maximum contamination between any pair of geographic regions. That is, the maximum contamination can be user-defined such that the contamination of the geographic regions is less than this maximum contamination. For example, the maximum contamination can be set at 10% (or some other appropriate amount) such that the contamination between any two geographic regions is less than 10%.

In some examples, the computing system 102 can merge the geographic regions based on the contamination of the geographic regions. Specifically, the computing device 102 can identify two pairs of cross-contaminated geographic regions. A first pair of the cross-contaminated geographic regions both include geographic locations specified by the historical location data 120 of the user profiles for each of a threshold number of first users; and a second pair of cross-contaminated geographic regions both include geographic locations specified by the historical location data 120 of the user profiles for each of a threshold number of second users. The computing device 102 identifies a first contamination of the first pair of cross-contaminated geographic regions and a second contamination of the second pair of cross contaminated geographic regions, and compares such to determine that the first contamination is greater than the second contamination. The computing device 102, based on the first contamination being greater than the second contamination, merges the first pair of cross-contaminated geographic regions to define a further merged geographic region.

Figure 4:
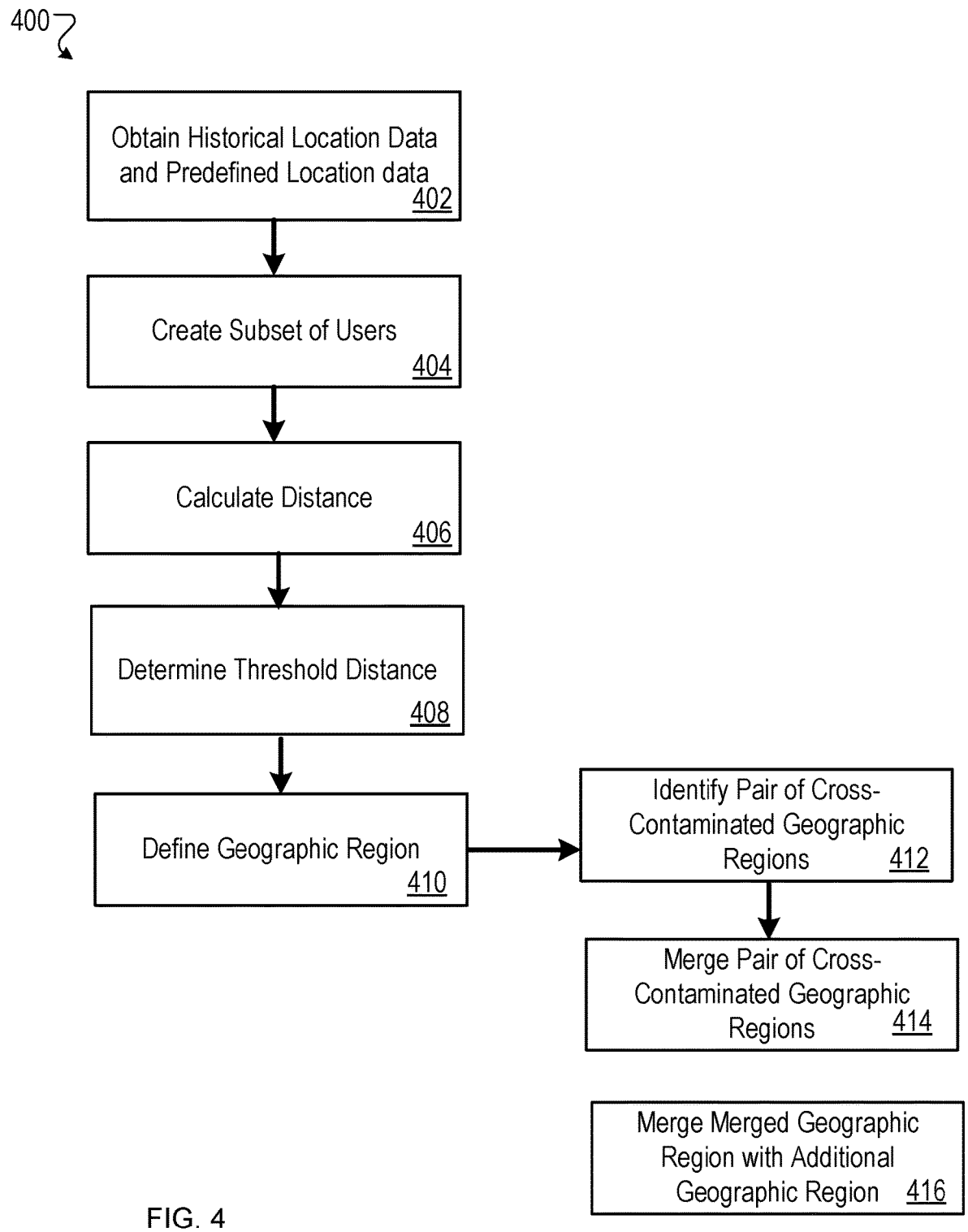
FIG. 4 is a flowchart of an example process for selective merging of geographic regions.

FIG. 4 illustrates an example process 400 for selective merging of geographic regions. The process 400 can be performed, for example, by the computing system 102, or another data processing apparatus. The process 400 can also be implemented as instructions stored on computer storage medium, and execution of the instructions by one or more data processing apparatus cause the one or more data processing apparatus to perform some or all of the operations of the process 400.

The computing device 102 can obtain, for each user of a plurality of users, i) historical location data 120 from the geographic location database 106 for the user and ii) predefined geographic location data 122 from the geographic location database 106 for the user (402). Specifically, for a particular user, the historical location data 120 specifies geographic locations of the user over a period of time, e.g., as included in a user profile of the user. The predefined geographic location data 122, for a particular user, specifies a predefined geographic location of the user, e.g., as included by the user profile of the user. The computing device 102 creates a subset of the plurality of users that includes each user of the subset having historical location data specifying the point of interest (404). For example, for each point of interest, the computing device 102 examines the historical location data 120 to identify historical data 120 that specifies the point of interest. The computing device 102 can then identify the users and the user profiles of the users that includes the historical data 120 that specifies the point of interest. The computing device 102 can create the subset of the users that have historical location data specifying the point of interest using these identified users.

The computing device 102 can, for each point of interest, calculate, for each user of the subset of users, a distance between the geographic location of the point of interest and the predefined geographic location of the user that is included in the user profile of the user (406). The computing device 102 can, for each point of interest, determine a threshold distance that exceeds the calculated distances for a predetermined portion of the users (408). Specifically, the computing device 102 determines the threshold distance such that a predetermined portion (or percentage) of the calculate distances are less than the threshold distance. The computing device 102 can, for each point of interest, define a geographic region of the point of interest that includes a) the geographic location of the point of interest and b) a geographic area that is within the threshold distance of the geographic location of the point of interest (410). For example, the computing device 102, for the point of interest, defines the geographic region of the point of interest to include the geographic location as the center and extends radially outward to the threshold distance for the point of interest to include the geographic area between the geographic location of the point of interest and the threshold distance.

The computing device 102 identifies a pair of geographic regions that are cross-contaminated (412). Specifically, the computing device 102 identifies pairs of geographic regions that both include geographic locations specified by the historical location data 120 for each of a threshold number of users. The computing device 102, in response to identifying a pair of geographic regions that are cross-contaminated, merges the pair of cross-contaminated geographic regions to define a merged geographic region (414). Specifically, the computing device 102 merges the pair of cross-contaminated geographic regions to define the merged geographic region that includes properties of both of the cross-contaminated geographic regions. The computing device 102 merges the merged geographic region with one or more additional geographic regions until a cross-contamination between a resulting merged geographic region created by the merging and other geographic regions is reduced to a specified level of cross-contamination (416). Specifically, the computing device 102 identifies a further pair of cross-contaminated geographic regions that both include geographic locations specified by the historical location data 120 of the user profiles for each of a threshold number of users. The further pair of cross-contaminated geographic regions includes the merged geographic region. The computing system 102, in response to identifying the further pair of cross-contaminated geographic regions, merges the further pair of cross-contaminated geographic regions to define a further merged geographic region.

In some examples, the further merged geographic region and a neighboring geographic region can be used for distribution of the digital content. For example, the further merged geographic region can be used as a treatment geographic region and the neighboring geographic region can be used as the control geographic region. Digital content can be distributed to the further merged geographic region as the treatment geographic region; and digital content is prevented from being distributed to the neighboring geographic region as the control geographic region. The further merged geographic region and the neighboring geographic region can be used for determining how exposure of the digital content affects offline user behavior. Specifically, any metric related to offline user behavior can be measured that is related to the points of interest that are respectively included by the further merged geographic region and the neighboring geographic region. The difference between the metrics of the further merged geographic region and the neighboring geographic region can be determined. The difference can indicate an effect of exposure of the digital content within the further merged geographic region (e.g., the treatment region) and the lack of exposure of the digital content within the control geographic region (e.g., the control region).

Figure 5:
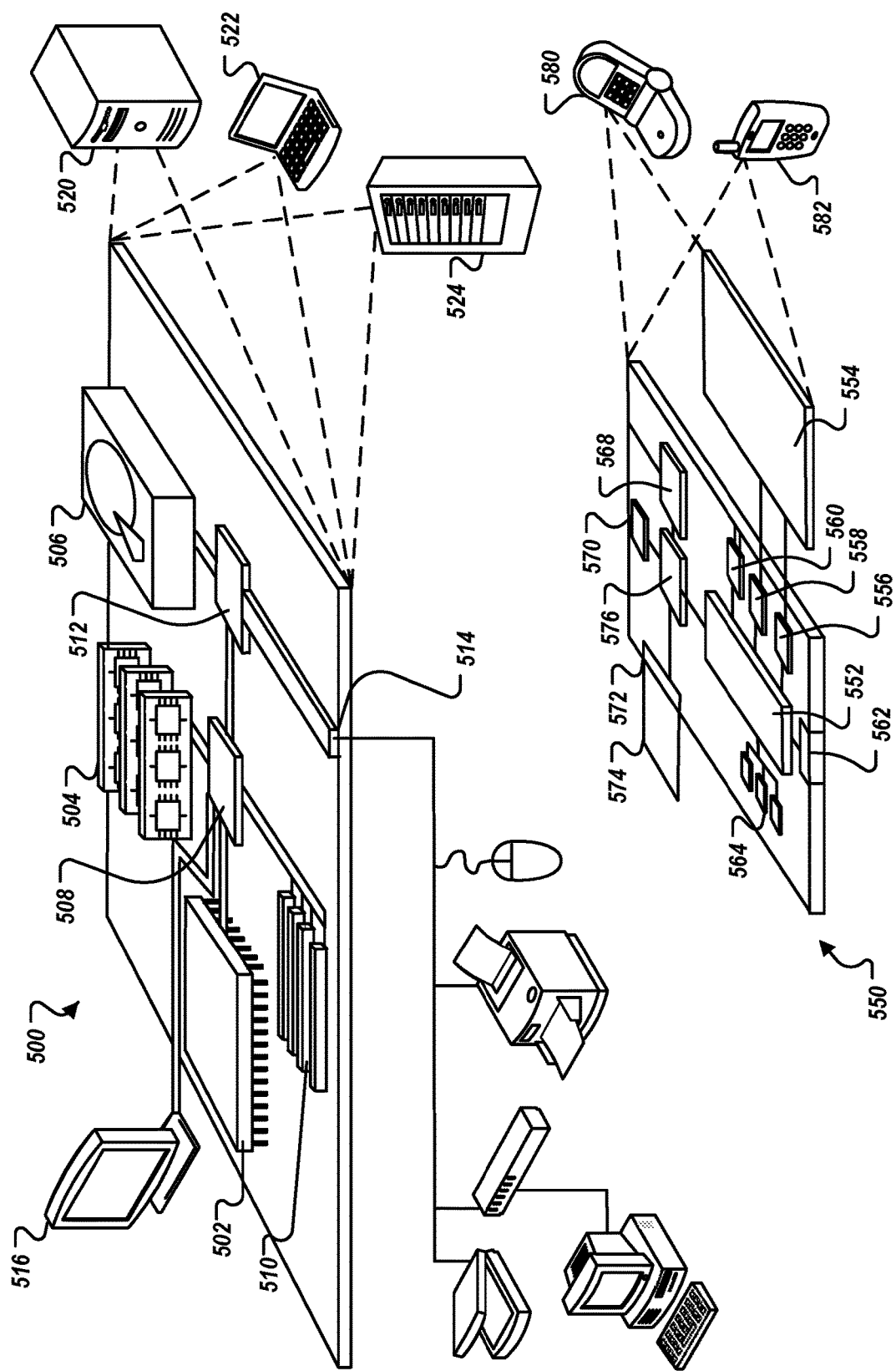
FIG. 5 depicts an example computing system that may be used to implement the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 640, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 648 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580.

It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:
1. A computer-implemented method, comprising:
   obtaining, for each user of a plurality of users, i) historical location data specifying geographic locations of the user over a period of time that is included in a user profile of the user and ii) predefined geographic location data specifying a predefined geographic location of the user that is included in the user profile of the user;
   for each point of interest among a plurality of points of interest:
   i) creating a subset of the plurality of users that includes each user having historical location data specifying the point of interest;
   ii) calculating, for each user of the subset of users, a distance between a geographic location of the point of interest and the predefined geographic location of the user that is included in the user profile of the user;
   iii) determining a threshold distance that exceeds the calculated distances for a predetermined portion of the users; and
   iv) defining a geographic region for the point of interest that includes a) the geographic location of the point of interest and b) a geographic area that is within the threshold distance of the geographic location of the point of interest;
   identifying a pair of cross-contaminated geographic regions based on a determination that the historical location data for at least a threshold number of user profiles each specifies geographic locations from both geographic regions of the pair of cross-contaminated geographic regions;

in response to identifying the pair of cross-contaminated geographic regions, merging the pair of cross-contaminated geographic regions to define a merged geographic region; and merging the merged geographic region with one or more additional geographic regions until the historical location data for fewer than a specified quantity of users specifies a geographic location from each of (i) a resulting merged geographic region created by the merging and (ii) at least one other geographic region outside of the merged geographic region.

2. The computer-implemented method of claim 1, further comprising:

identifying a further pair of cross-contaminated geographic regions that both include geographic locations specified by the historical location data of the user profiles for each of a threshold number of users of the plurality of users, wherein the further pair of cross-contaminated geographic regions includes the merged geographic region; and in response to identifying the further pair of cross-contaminated geographic regions that both include geographic locations specified by the historical location data of the user profiles for each of a threshold number of users of the plurality of users, merging the further pair of cross-contaminated geographic regions to define a further merged geographic region.

3. The computer-implemented method of claim 1, further comprising:

identifying two pairs of cross-contaminated geographic regions where i) a first pair of cross-contaminated geographic regions both include geographic locations specified by the historical location data of the user profiles for each of a threshold number of first users of the plurality of users and ii) a second pair of cross-contaminated geographic regions both include geographic locations specified by the historical location data of the user profiles for each of a threshold number of second users of the plurality of users;

identifying a first contamination of the first pair of cross-contaminated geographic regions and a second contamination of the second pair of cross-contaminated geographic regions;

comparing the first contamination and the second contamination to determine that the first contamination is greater than the second contamination; and based on the comparing, merging the first pair of cross-contaminated geographic regions to define a further merged geographic region.

4. The computer-implemented method of claim 1, further comprising:

after merging any two geographic regions, identifying a contamination of each merged geographic region and each unmerged geographic region;

comparing the contamination of each merged geographic region and each unmerged geographic region with a cross-contamination threshold;

determining that the contamination of each merged geographic region and each unmerged geographic region is less than the cross-contamination threshold; and in response to determining that the contamination of each merged geographic region and each geographic region is less than the cross-contamination threshold, ceasing merging of the geographic regions.

5. The computer-implemented method of claim 4, wherein a parameter for determining the contamination threshold is a maximum contamination between any pair of geographic regions.

6. The computer-implemented method of claim 1, wherein identifying the pair of cross-contaminated geographic regions comprises:

determining that the user profile of each user of the threshold number of users includes profile data that indicates that the user was in each of the cross-contaminated geographic regions within a predetermined time period.

7. The computer-implemented method of claim 1, wherein obtaining, for each user of a plurality of users, i) historical location data specifying geographic locations of the user over a period of time that is included in a user profile of the user and ii) predefined geographic location data specifying a predefined geographic location of the user that is included in the user profile of the user further includes:

obtaining, for each user of the plurality of users, user-provided input of the predefined geographic location that is included in the user profile of the user.

8. The computer-implemented method of claim 1, wherein obtaining, for each user of a plurality of users, i) historical location data specifying geographic locations of the user over a period of time that is included in a user profile of the user and ii) predefined geographic location data specifying a predefined geographic location of the user that is included in the user profile of the user further includes:

obtaining, for each user of the plurality of users, a geographic location where one or more queries are provided by the user, the geographic location proximate to the geographic location of the point of interest.

9. A system comprising:

one or more computers and one or more storage devices storing instructions that are operable, when executed by the one or more computers, to cause the one or more computers to perform operations comprising:

obtaining, for each user of a plurality of users, i) historical location data specifying geographic locations of the user over a period of time that is included in a user profile of the user and ii) predefined geographic location data specifying a predefined geographic location of the user that is included in the user profile of the user;

for each point of interest among a plurality of points of interest:

i) creating a subset of the plurality of users that includes each user having historical location data specifying the point of interest;

ii) calculating, for each user of the subset of users, a distance between a geographic location of the point of interest and the predefined geographic location of the user that is included in the user profile of the user;

iii) determining a threshold distance that exceeds the calculated distances for a predetermined portion of the users; and iv) defining a geographic region for the point of interest that includes a) the geographic location of the point of interest and b) a geographic area that is within the threshold distance of the geographic location of the point of interest;

identifying a pair of cross-contaminated geographic regions based on a determination that the historical location data for at least a threshold number of user profiles each specifies geographic locations from both geographic regions of the pair of cross-contaminated geographic regions;

in response to identifying the pair of cross-contaminated geographic regions, merging the pair of cross-contaminated geographic regions to define a merged geographic region; and merging the merged geographic region with one or more additional geographic regions until the historical location data for fewer than a specified quantity of users specifies a geographic location from each of (i) a resulting merged geographic region created by the merging and (ii) at least one other geographic region outside of the merged geographic region.

10. The system of claim 9, the operations further comprising:

identifying a further pair of cross-contaminated geographic regions that both include geographic locations specified by the historical location data of the user profiles for each of a threshold number of users of the plurality of users, wherein the further pair of cross-contaminated geographic regions includes the merged geographic region; and in response to identifying the further pair of cross-contaminated geographic regions that both include geographic locations specified by the historical location data of the user profiles for each of a threshold number of users of the plurality of users, merging the further pair of cross-contaminated geographic regions to define a further merged geographic region.

11. The system of claim 9, the operations further comprising:

identifying two pairs of cross-contaminated geographic regions where i) a first pair of cross-contaminated demographic regions both include geographic locations specified by the historical location data of the user profiles for each of a threshold number of first users of the plurality of users and ii) a second pair of cross-contaminated demographic regions both include geographic locations specified by the historical location data of the user profiles for each of a threshold number of second users of the plurality of users;

identifying a first contamination of the first pair of cross-contaminated geographic regions and a second contamination of the second pair of cross-contaminated geographic regions;

comparing the first contamination and the second contamination to determine that the first contamination is greater than the second contamination; and based on the comparing, merging the first pair of cross-contaminated geographic regions to define a further merged geographic region.

12. The system of claim 9, the operations further comprising:

after merging any two geographic regions, identifying a contamination of each merged geographic region and each unmerged geographic region;

comparing the contamination of each merged geographic region and each unmerged geographic region with a threshold;

determining that the contamination of each merged geographic region and each unmerged geographic region is less than a cross-contamination threshold; and in response to determining that the contamination of each merged geographic region and each geographic region is less than the cross-contamination threshold, ceasing merging of unmerged geographic regions.

13. The system of claim 12, wherein a parameter for determining the contamination threshold is a maximum contamination between any pair of geographic regions.

14. The system of claim 9, wherein identifying the pair of cross-contaminated geographic regions comprises:

determining that the user profile of each user of the threshold number of users includes profile data that indicates that the user was in each of the cross-contaminated geographic regions within a predetermined time period.

15. The system of claim 9, wherein obtaining, for each user of a plurality of users, i) historical location data specifying geographic locations of the user over a period of time that is included in a user profile of the user and ii) predefined geographic location data specifying a predefined geographic location of the user that is included in the user profile of the user further includes:

obtaining, for each user of the plurality of users, user-provided input of the predefined geographic location that is included in the user profile of the user.

16. The system of claim 9, wherein obtaining, for each user of a plurality of users, i) historical location data specifying geographic locations of the user over a period of time that is included in a user profile of the user and ii) predefined geographic location data specifying a predefined geographic location of the user that is included in the user profile of the user further includes:

obtaining, for each user of the plurality of users, a geographic location where one or more queries are provided by the user, the geographic location proximate to the geographic location of the point of interest.

17. A non-transitory computer-readable medium storing software comprising instructions executable by one or more computers which, upon such execution, cause the one or more computers to perform operations comprising:

obtaining, for each user of a plurality of users, i) historical location data specifying geographic locations of the user over a period of time that is included in a user profile of the user and ii) predefined geographic location data specifying a predefined geographic location of the user that is included in the user profile of the user;

for each point of interest among a plurality of points of interest:

i) creating a subset of the plurality of users that includes each user having historical location data specifying the point of interest;

ii) calculating, for each user of the subset of users, a distance between a geographic location of the point of interest and the predefined geographic location of the user that is included in the user profile of the user;

iii) determining a threshold distance that exceeds the calculated distances for a predetermined portion of the users; and iv) defining a geographic region for the point of interest that includes a) the geographic location of the point of interest and b) a geographic area that is within the threshold distance of the geographic location of the point of interest;

identifying a pair of cross-contaminated geographic regions based on a determination that the historical location data for at least a threshold number of user profiles each specifies geographic locations from both geographic regions of the pair of cross-contaminated geographic regions;

in response to identifying the pair of cross-contaminated geographic regions, merging the pair of cross-contaminated geographic regions to define a merged geographic region; and merging the merged geographic region with one or more additional geographic regions until the historical location data for fewer than a specified quantity of users specifies a geographic location from each of (i) a resulting merged geographic region created by the merging and (ii) at least one other geographic region outside of the merged geographic region.

18. The computer-readable medium of claim 17, the operations further comprising:

identifying a further pair of cross-contaminated geographic regions that both include geographic locations specified by the historical location data of the user profiles for each of a threshold number of users of the plurality of users, wherein the further pair of cross-contaminated geographic regions includes the merged geographic region; and in response to identifying the further pair of cross-contaminated geographic regions that both include geographic locations specified by the historical location data of the user profiles for each of a threshold number of users of the plurality of users, merging the further pair of cross-contaminated geographic regions to define a further merged geographic region.

\* \* \* \* \*